United States Patent [19]

Neko et al.

[11] Patent Number: 5,251,146
[45] Date of Patent: Oct. 5, 1993

[54] INJECTION COMPRESSION MOLDING METHOD AND AN APPARATUS THEREFOR

[75] Inventors: Noriaki Neko, Oshino; Hiroshi Umemoto, Hino; Kazuo Kubota, Fujiyoshida, all of Japan

[73] Assignee: Fanuc Ltd., Minamitsuru, Japan

[21] Appl. No.: 947,964

[22] Filed: Sep. 21, 1992

Related U.S. Application Data

[63] Continuation of Ser. No. 381,639, Jul. 5, 1989, abandoned.

[30] Foreign Application Priority Data

Feb. 5, 1988 [JP] Japan .................. 63-23957

[51] Int. Cl.⁵ .................. G06F 15/46; B29C 45/76
[52] U.S. Cl. .................. 364/476; 264/40.1; 264/40.5; 264/40.7; 425/149; 425/162
[58] Field of Search .......... 364/476, 473; 264/40.1, 264/40.5, 40.7, 328.1; 425/135, 149, 150, 162, 163, 145, 146, 161

[56] References Cited

U.S. PATENT DOCUMENTS

| | | | |
|---|---|---|---|
| 3,840,312 | 10/1974 | Paulson et al. | 364/476 |
| 3,860,801 | 1/1975 | Hunkar | 364/476 |
| 3,977,255 | 8/1976 | Groleau et al. | 364/476 |
| 4,274,823 | 6/1981 | Stanciu et al. | 364/476 |
| 4,525,134 | 6/1985 | McHenry et al. | 364/476 |
| 4,816,196 | 3/1989 | Otake | 364/476 |
| 4,823,274 | 4/1989 | Kiya et al. | 364/476 |
| 4,847,779 | 7/1989 | Masao et al. | 364/476 |
| 4,983,336 | 1/1991 | Langlois | 364/476 |
| 5,016,184 | 5/1991 | Gutjahr | 364/476 |

*Primary Examiner*—Joseph Ruggiero
*Attorney, Agent, or Firm*—Staas & Halsey

[57] ABSTRACT

An injection compression molding method and an apparatus therefor are provided, which are capable of accurately performing a molten resin compression operation during execution of an injection/hold operation or a metering operation, so as to produce high-quality molded products with no substantial variations between these products.

A processing device for numerical control for controlling the drive of servomotors for individual axes of an injection molding machine executes pulse distribution associated with an axis for molten resin compression concurrently with execution of pulse distribution for an injection axis or a screw rotation axis (S200, S205) on the basis of information specifying the molten resin compression axis, information for the molten resin compression control including the feed amount, feed rate and feed direction associated with the molten resin compression axis, and a molten resin compressing operation command, which are respectively delivered from a programmable machine controller for sequence-controlling various operating sections of the injection molding machine upon elapse of a preset timer period from an instant at which an injection operation is started. The processing device also effects torque limit control of an output torque of a compression sevomotor so that a compression force actually applied to the molten resin attains a preset value.

8 Claims, 3 Drawing Sheets

INJECTION COMPRESSION MOLDING METHOD AND AN APPARATUS THEREFOR

This application is a continuation of application Ser. No. 07/381,639, filed Jul. 5, 1989, now abandoned, of International Application No. PCT/JP89/00088.

BACKGROUND OF THE INVENTION

The present invention relates to an injection compression molding method and an apparatus therefor, which are capable of accurately controlling a compression force applied to molten resin injected into a mold of an electrically-operated injection compression molding machine so as to uniformly fill the mold with the molten resin. This produces high-quality molded products with high reproducibility.

It is known to effect injection compression molding wherein a molten resin injected into a mold is compressed, so that the molten resin reaches fine parts of a cavity of the mold. This attains improvement in dimensional accuracy and uniformity of density of molded products. Typically, injection compression molding is effected by driving a compression pin, provided in a clamping mechanism of a hydraulic injection molding machine, from a movable platen toward the mold by the use of a hydraulic mechanism, so that the compression pin applies a compression force on the molten resin in the mold. However, according to the prior art apparatus of the type driving the compression pin by means of the hydraulic mechanism, due to the presence of variations in properties of hydraulic oil for the hydraulic mechanism resulting from a change in temperature of the injection molding machine, it is difficult to control the driving force applied to the compression pin and the moving position of the compression pin. That is, the compression force applied to the molten resin with required accuracy and reproducibility is not attained. This results in a variation of quality between the resultant molded products.

SUMMARY OF THE INVENTION

The object of the present invention is to provide an injection compression molding method and an apparatus therefor, which are capable of producing high-quality molded products with high reproducibility.

According to one aspect of the present invention, an injection compression molding method is provided, which is applied to an injection molding machine wherein servomotors associated with individual axes are drivingly controlled by means of a processing device for numerical control, and various operating sections are sequence-controlled by means of a programmable machine controller. The injection compression molding method comprises the steps of: (a) determining whether or not a condition for starting an operation of compressing molten resin is fulfilled; (b) delivering a command for operation of compressing the molten resin, information specifying an axis associated with the molten resin compression, and information for control of the molten resin compression, from the programmable machine controller to the processing device for numerical control when the start condition is fulfilled; (c) executing pulse distribution associated with the specified axis in response to the command and on the basis of the control information by means of the processing device for numerical control; and (d) controlling an output torque of a servomotor associated with the specified axis during the execution of the step (c), so that a compression force actually applied to the molten resin attains a preset value.

According to another aspect of the present invention, an electrically-operated injection compression molding machine comprises: a processing device for numerical control for drivingly controlling servomotors associated with individual axes; a programmable machine controller for sequence-controlling various operating sections of the molding machine; memory means arranged to be accessed from both the processing device for numerical control and the programmable machine controller; pressure detecting means for detecting a compression force actually applied to molten resin; means for presetting an axis associated with molten resin compression, information for control of the molten resin compression, a compression force to be applied to the molten resin, and timing for starting an operation of compressing molten; and torque limiting means for restricting an output torque of one of the servomotors which corresponds to the axis associated with the molten resin compression. The programmable machine controller includes means for delivering, to the memory means, a command for compressing the molten resin, information specifying the preset axis for the molten resin compression, and information for control of the molten resin compression, upon arrival of the start timing of molten resin compression. The processing device for numerical control is arranged to execute pulse distribution associated with the axis for the molten resin compression in response to the command for the compressing operation and on the basis of the information for control of the molten resin compression, and to control the output torque of a servomotor corresponding to the axis associated with the molten resin compression so that a compressing force actually applied to the molten resin attains the preset compression force.

As mentioned above, according to the present invention, pulse distribution for the axis associated with the molten resin compression is executed by means of the processing device for numerical control. The output torque of the servomotor associated with the axis for the molten resin compression is controlled so that the compression force actually applied to the molten resin attains the preset value on the basis of the information specifying the axis for the molten resin compression, the information for control of the molten resin compression, and the command for operation of the molten resin compression, which are respectively delivered from the programmable machine controller, upon fulfillment of the start condition of molten resin compression. Accordingly, the molten resin compressing operation can be carried out in an accurate manner, so as to produce high-quality molded products with no substantial variations therebetween.

DESCRIPTION OF THE PREFERRED EMBODIMENT

Figure 3:
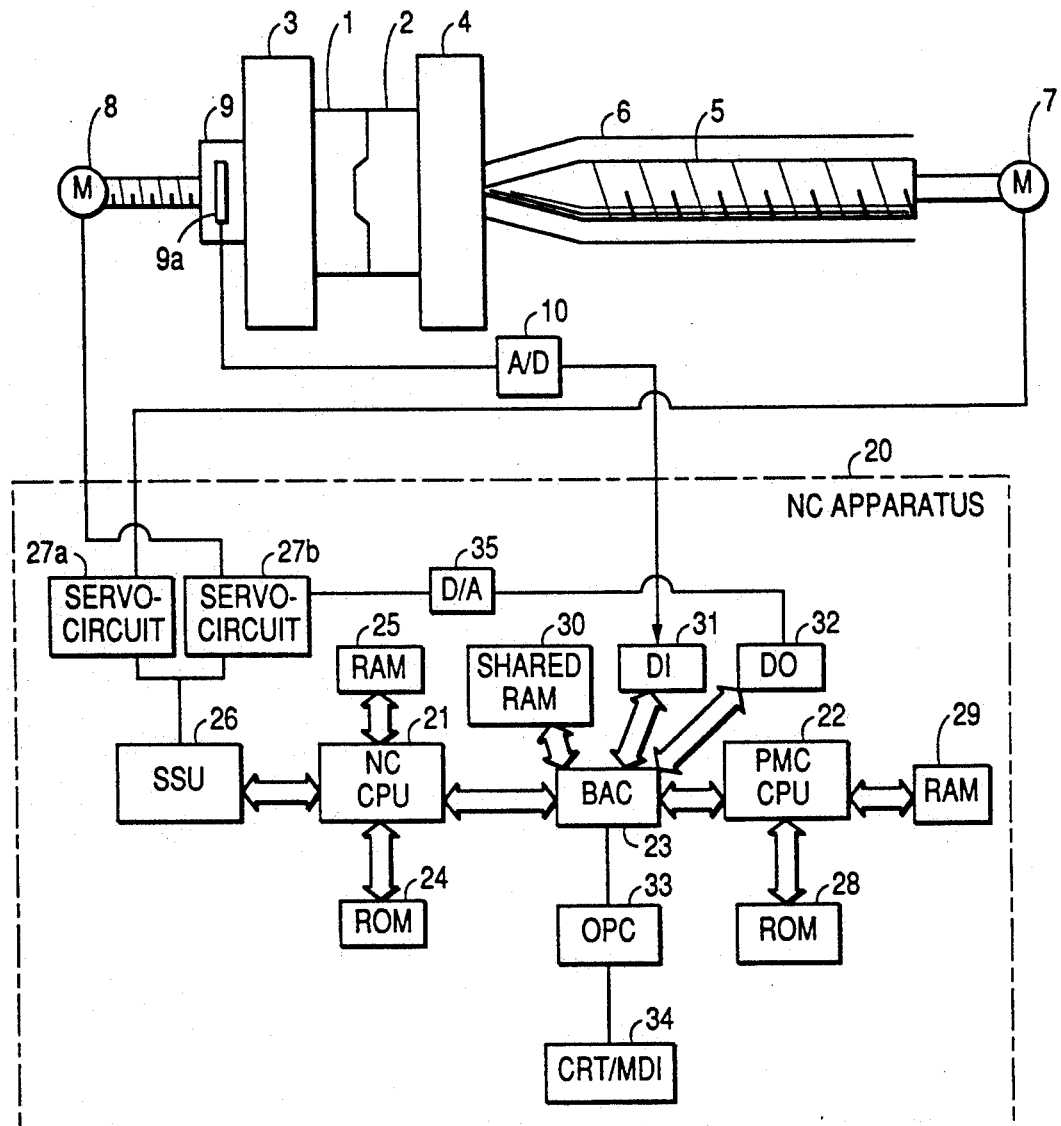
FIG. 3 is a schematic diagram, partly shown by a block diagram, of an essential portion of an electrically-operated injection compression molding machine to which is applied the injection compression molding method of the aforesaid embodiment.

An electrically-operated injection molding machine to which an injection compression molding method according to an embodiment of the present invention is applied, comprises various operating sections, respectively driven by servomotors, for injection, metering, mold-opening, mold-closing, mold-clamping, molded product-ejecting and the like. For example, as shown in FIG. 3, the injection molding machine comprises a mold clamping mechanism which includes stationary and movable platens 3 and 4 which are respectively mounted with mold halves 1 and 2, and a servomotor (not shown) for clamping an axis. An injection mechanism is provided which includes a screw 5 fitted in a heating cylinder 6, axially driven by an injection servomotor 7 through a rotary motion/linear motion converting mechanism (not shown), and rotatively driven by a servomotor for screw rotation. An ejector (not shown) is also provided.

Further, in order to apply a compression force on molten resin injected into a mold cavity (not shown) defined by the mold halves 1 and 2 during execution of an injection process by means of the injection servomotor 7 or upon completion of the same process, a pin (not shown) for molten resin compression arranged to project into the mold cavity is supported for reciprocal motion by the movable platen 3, for instance. Also, the pin is coupled to a servomotor 8 for molten resin compression through a rotary motion/linear motion converting mechanism 9. Both the elements 8 and 9 are provided on the movable platen 3. Furthermore, a pressure detector for detecting a compression force applied to the molten resin, e.g., a load cell 9a, is mounted on a linear motion member (not shown) of the converting mechanism 9, for instance. In the meantime, the provision of the servomotor 8 for compression is not inevitably required. For example, the servomotor for the ejector may be arranged to also serve as the servomotor for molten resin compression.

Reference numeral 20 denotes a numerical control unit (hereinafter referred to as NC unit) for controlling various operations of the injection molding machine. The NC unit 20 comprises a central processing unit (hereinafter referred to as CPU) 21 for numerical control, and a CPU 22 for a programmable machine controller (hereinafter referred to as PMC). Connected through buses to the NCCPU 21 are a ROM 24 storing therein a control program for generally controlling the injection molding machine, a RAM 25 for temporal storage of data, and a servo-interface 55V 26 to which are connected servo circuits (only servo circuits associated with the servomotors 7 and 8 for injection and compression, are shown by reference numerals 27a and 28a, respectively) for drivingly controlling the aforesaid servomotors for individual axes. Each of the servo circuits is connected to a position detector, e.g., a pulse coder (not shown) mounted on a corresponding one of the servomotors. Connected through buses to the PMCCPU 22 are a ROM 28 storing therein a sequence program for controlling sequence operations of the injection molding machine and the like; and a RAM 29 for temporal storage of data produced during arithmetic processing of the CPU 22.

Connected through buses to both the CPUs 21 and 22 is a bus arbiter controller (hereinafter referred to as BAC) 23 to which a shared RAM 30, an input circuit 31 and an output circuit 32 are connected through buses, and to which a manual data input device 34 with a CRT display (hereinafter referred to as CRT/MDI) is connected through an operator panel controller 33. The shared RAM 30, comprised of a read/write enabled, nonvolatile memory such as a bubble memory and a CMOS memory, is arranged to store, for instance, an NC program for controlling operation of the injection molding machine, various preset values, parameters, and macro variables which determine injection molding conditions. The input circuit 31 is connected through an A/D converter 10 to the load cell 9a and various sensors (not shown) provided in the injection molding machine. The output circuit 32 is connected to various actuators (not shown) of the injection molding machine, and is also connected through a D/A converter 35 to the servo circuit 27b corresponding to the compression servomotor 8 for performing the later-mentioned torque control.

In the following, operation of the injection molding machine constructed as mentioned above will be explained. At first, an operator presets, through the CRT/MDI 34, various injection molding conditions which include: information specifying an axis associated with a molten resin compression (step feed axis); control information for execution of a molten resin compression process (feed direction, target feed position (target feed amount), feed rate, and compression force (torque limit value for restricting a servomotor output torque during the molten resin compression)). These preset conditions are stored in the shared RAM 30.

When the injection molding machine is operated after completion of presetting the injection molding conditions, the NC unit 20 controls the injection molding machine in accordance with the sequence program stored in the ROM 28 and the NC program stored in the shared RAM 30, so as to repetitively execute an injection molding operation comprised of a series of processes which include mold-closing, mold-clamping, injection, compression, hold, cooling, metering, mold-opening, and molded product-ejecting, to thereby produce molded products. The NCCPU 21 executes the processing shown in FIG. 2 at predetermined intervals of the cycle during the execution of each injection molding operation.

That is, upon receipt of a command from the PMCCPU 22, the NCCPU 21 reads one block of that part of the NC program, which corresponds to the command, from the shared RAM 30, and delivers, through the servo-interface 26, an amount of pulse distribution. The amount of pulse distribution corresponds to one pulse distribution cycle and is calculated in accordance with control contents stated in the block concerned, i.e., movement command pulses corresponding to a moving amount of an associated servomotor. The amount of pulse distribution is delivered to a servo circuit associated with an axis specified by the program thereby causing the servomotor to move the moving amount for one pulse distribution cycle (step S200). Next, the NCCPU determines whether or not a molten resin compression mode (step mode) is selected (step S201). If the step mode is not selected, then the CPU further determines whether or not the pulse distribution for the aforesaid axis specified by the program has been completed (step S208). Whereupon, the NCCPU repetitively executes the loop consisting of the steps S200, S201 and S208 until the pulse distribution has been completed. Upon completion of the pulse distribution, the program advances to the step S209 to execute processing for the next block which is the same as the aforesaid processing.

Figure 1:
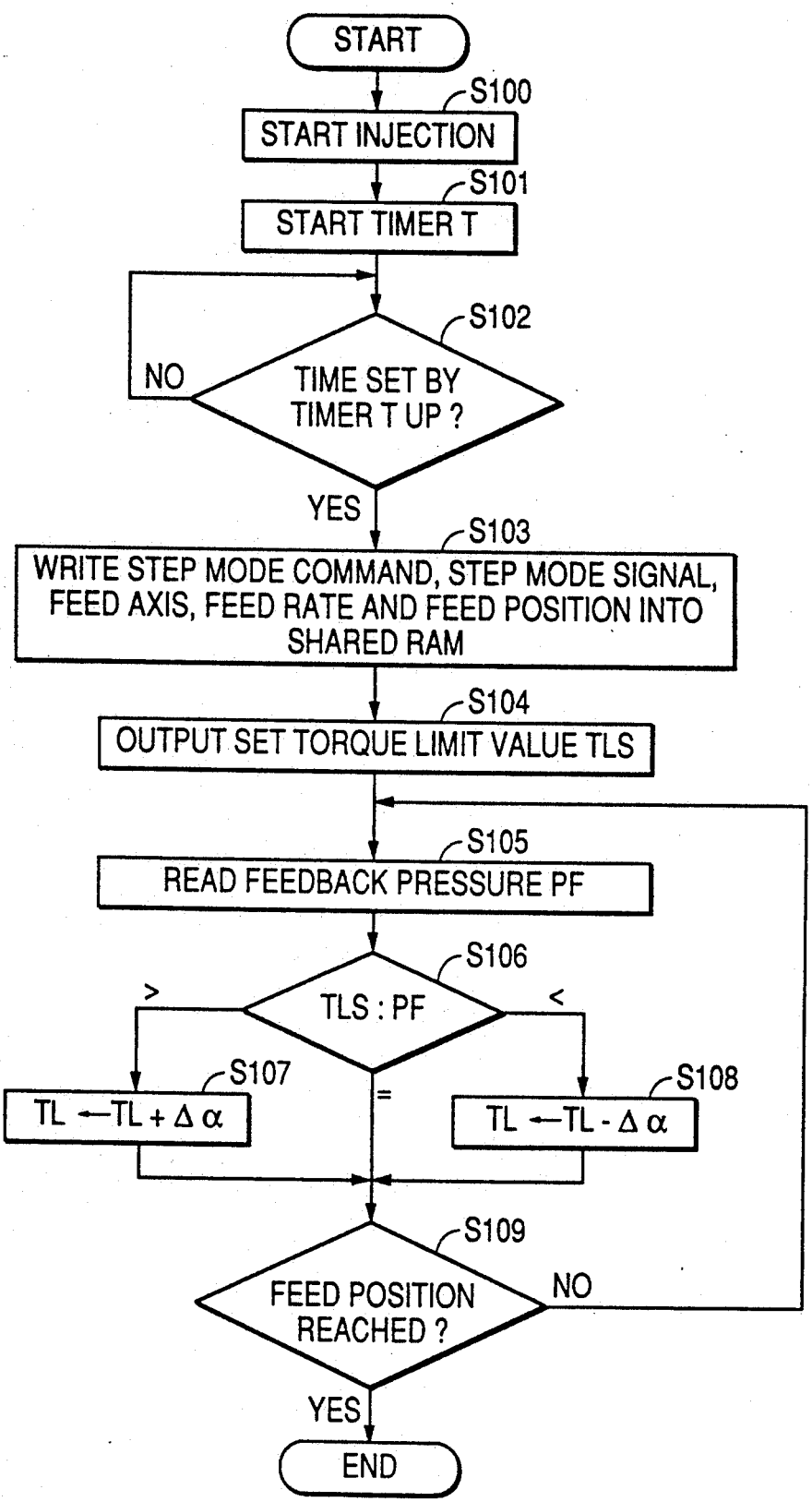
FIG. 1 is a flowchart of a control program for write processing of information for control of molten resin compression, and for preset processing of a torque limit value, in an injection compression molding method according to an embodiment of the present invention.

On the other hand, the PMCCPU 22 executes a control operation in accordance with the sequence program stored in the ROM 28. That is, as shown in FIG. 1, the PMCCPU 22 writes an injection start command into the shared RAM 30 through the BAC 23, and at the same time, starts a timer T for determining a start timing for a molten resin compressing operation (steps S100 and S101). At this time, the NCCPU 21 executes pulse distribution to the servo circuit 27a associated with the injection servomotor 7 in the above manner in response to the injection start command. The timer time period is set to a time period corresponding to an injection time, e.g., a time period substantially equal to or less than the injection time.

When the time T is up at the time the injection process is completed or during the execution of the injection process (step S102), the PMCCPU 22 writes a command for a molten resin compressing operation (step mode command), information specifying the aforesaid step feed axis, and control information for molten resin compressing process (step S103), into predetermined address regions of the shared RAM 30, respectively.

Figure 2:
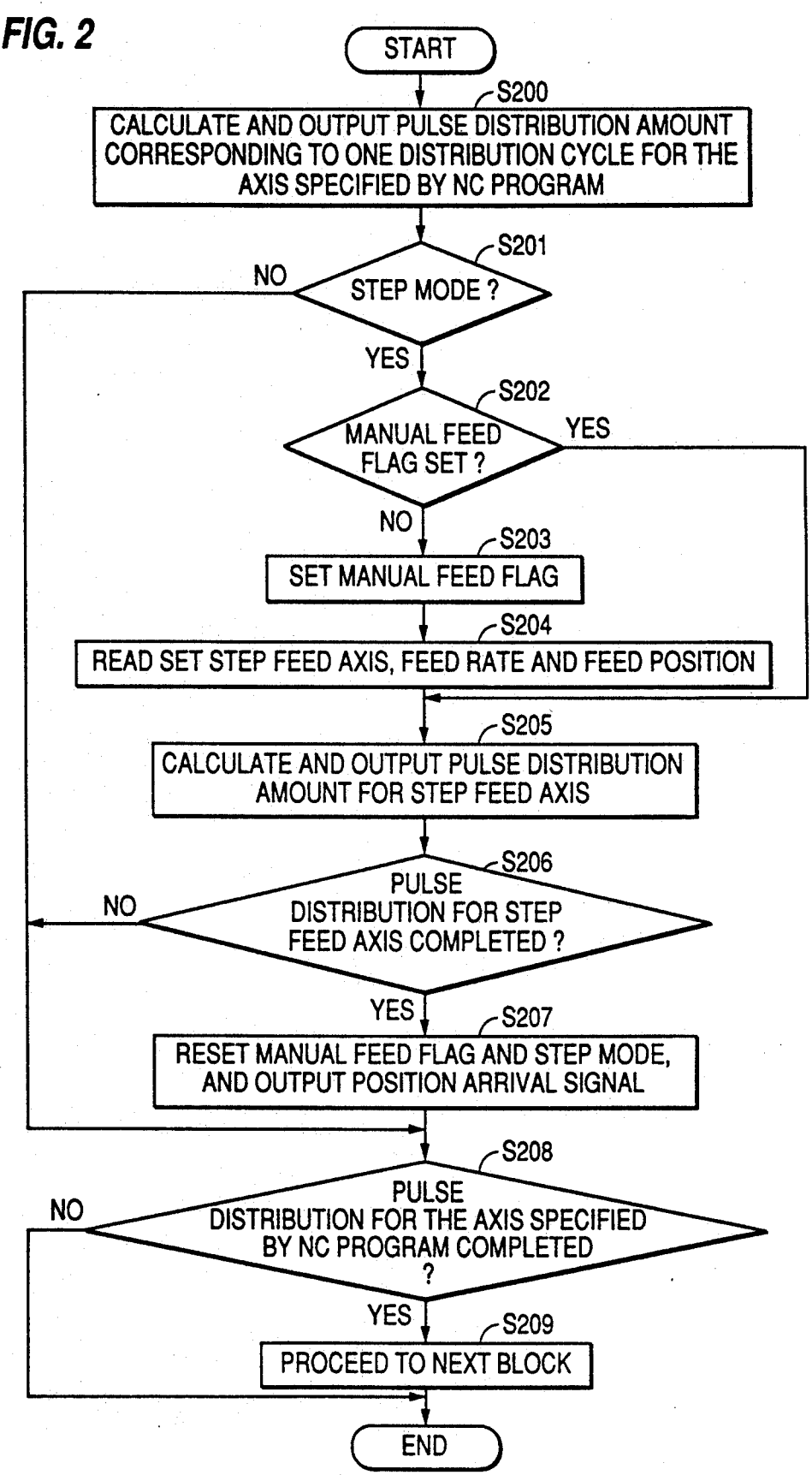
FIG. 2 is a flowchart of a control program for concurrently executing pulse distribution processes associated with two axes in the injection compression molding method of the aforementioned embodiment.

Upon the step mode command being written in the shared RAM 30, the NCCPU 21 determines that the step mode is selected at the step S201 of FIG. 2, and then determines whether or not a manual feed flag indicative of the step mode is set (step S202). If the manual feed flag is not set, the NCCPU sets the same flag (S203). That is the manual feed flag is set during the program execution cycle immediately after the step mode command is written into the shared RAM 30. Next, the PMCCPU 22 reads the control information for a molten resin compression process, which has been written in the predetermined address region of the shared RAM 30 by means of the same CPU, and calculates an amount of pulse distribution for the step feed axis, corresponding to one program execution cycle. The PMC CPU 22 further causes the shared RAM 30 to store the thus calculated value. On the basis of the calculated and stored value, the NCCPU 21 executes pulse distribution to a servo circuit for controlling the drive of the servomotor associated with the step feed axis, e.g., to the servo circuit 27b (step S205). As a result, the compression servomotor 8, for instance, rotates in the rotational direction corresponding to the feed direction at a rotational rate corresponding to the feed rate, accompanied with gradual projection of the compression pin (not shown), coupled to the linear motion member (not shown) of the converting mechanism 9, into the mold cavity, so as to start compression of the molten resin injected into the mold cavity.

The NCCPU 21 determines whether or not pulse distribution up to a target feed position for the step feed axis has been completed (step S206). If the pulse distribution has not been completed, the NCCPU further determines whether or not pulse distribution for an axis specified by the NC program, e.g., for the injection axis associated with hold and injection operations, has been completed (step S208). If the pulse distribution has not been completed as yet, the NCCPU repetitively executes a loop consisting of the steps S201, S202, S205, S206, and S208. That is, pulse distributions for both the axis specified by the NC program and the axis specified for molten resin compression (the step feed axis) are executed in a time-sharing manner such that both the pulse distributions for the two axes are performed concurrently in appearance, whereby these axes are moved concurrently. As a consequence, for example, a molten resin compressing operation is carried out by the compression servomotor 8 as the injection operation is effected by the injection servomotor 7 or as the metering operation is effected by the screw rotation servomotor (not shown).

During the execution of the molten resin compressing operation, the PMCCPU 22 reads a torque limit value TLS (indicative of an upper limit value of the output torque of the servomotor associated with the step feed axis) for this compressing operation, which is preset in the shared RAM 30. The PMC CPU then delivers this preset torque limit value to the servo circuit associated with the servomotor which corresponds to the step feed axis, e.g., the servo circuit 27b associated with the compression servomotor 8, through the output circuit 32 and the D/A converter 35 (step S104 of FIG. 1). Next, the PMCCPU reads a feedback signal, supplied from the pressure detector, e.g., the load cell 9a, through the input circuit 31 and the A/D converter 10 and indicative of a pressure PF actually applied to the molten resin (step S105), and further compares the same with the preset torque limit value TLS (step S106). torque limit value TL delivered to the servo circuit 27b, for instance, is increased to a value which is larger than the preset value by $\Delta \alpha$ if the feedback pressure PF is less than the preset torque limit value TLS; whereas the value TL is decreased by $\Delta \alpha$ if the pressure is larger than the preset value (steps S107 and S108). If the feedback pressure PF and the value TLS are equal to each other, the program advances to the step S109 so as to make a determination as to whether or not the target step feed position has been reached, without alteration of the preset torque limit value. In this manner, by controlling the compression force in a feedback manner while the preset torque limit value is changed, where required, the actual compression force is controlled to the preset value while a control error, due to a change of the passage of time in the molten resin compressing system of the injection molding machine, is compensated for. In the meantime, a coincidence accuracy of the feedback value (actual value) PF with the preset value TLS changes in dependence on respective resolutions of the A/D converter 10 and the D/A converter 35.

When the pulse distribution up to the target feed position associated with the step feed axis is completed (step S206 of FIG. 2), the NCCPU 21 resets the manual feed flag so as to reset the step mode, and then writes a signal, indicative of arrival to the step feed position, in the shared RAM 30 (step S207). Upon the signal indicative of arrival to the step feed position being written in the shared RAM 30 (step S109 of FIG. 1), the PMCCPU 22 completes the compressing operation.

As mentioned above, the molten resin compressing operation is carried out accurately during the execution of the injection/hold operation or metering operation, whereby high-quality molded products can be manufactured with no substantial variations between these products.

What is claimed is:

1. An injection compression molding method comprising the steps of:
   (a) determining whether or not a condition for starting an operation of compressing molten resin is fulfilled:
   (b) delivering a command for operation of compressing the molten resin, information specifying an axis associated with the molten resin compression, and information for controlling the molten resin compression, from a programmable machine controller for effecting sequence control of various operating sections of an injection molding machining to a processing device for numerical control for drivingly controlling servomotors associated with individual axes of the injection molding machine, when the start condition is fulfilled;
   (c) executing pulse distribution associated with the axis specified for molten resin compression during an injection/hold pressure operation or a metering operation in response to the command and on the basis of the control information by means of the processing device for numerical control to convert the movement of the axis specified into movement in the direction of the axis of an injection screw; and
   (d) controlling an output torque of a servomotor associated with the axis specified for molten resin compression during the execution of said step, so that a compression force actually applied to the molten resin attains a preset value, whereby a molten resin compressing operation is carried out by the servomotor associated with the specified axis during an injection molding operation including injection, hold, and metering.

2. An injection compression molding method according to claim 1, wherein the pulse distribution for the specified axis is executed concurrently with an execution of pulse distribution for an axis other than the specified axis, in said step (c).

3. An injection compression molding method according to claim 1, wherein the fulfillment of the start condition for the molten resin compressing operation is determined in said step (a) when a predetermined time period, which is determined in dependence on an injection time, has elapsed from an instant at which an injection operation of the injection molding machine is started.

4. An injection compression molding method according to claim 1, wherein the control information for molten resin compression includes a feed amount, feed rate and feed direction associated with the specified axis, and a torque limit value indicative of an upper limit value of an output torque of a servomotor associated with the specified axis.

5. An electrically-operated injection compression molding machine for injecting molten resin and including servomotors associated with individual axes, comprising:
   processing device for numerical control for drivingly controlling the servomotors associated with individual axes;
   a programmable machine controller for sequence-controlling various operating sections of said molding machine;
   memory means arranged to be accessed by both said processing device for numerical control and said programmable machine controller;
   pressure detecting means for detecting a compression force actually applied to the molten resin;
   means for presetting an axis associated with the molten resin compression, for providing information for controlling the molten resin compression, for providing a preset compression force to be applied to the molten resin, and for providing a timing for starting an operation for compressing the molten resin; and
   torque limiting means for restricting an output torque of one of the servomotors corresponding to said axis associated with the molten resin compression;
   said programmable machine controller including means for delivering to said memory means, a command for compressing the molten resin, information specifying said axis for the molten resin compression, and information for controlling the molten resin compression, upon arrival of said timing for starting the molten resin compression; and
   said processing device for numerical control being arranged to execute pulse distribution associated with said axis for the molten resin compression in response to said command for compressing the molten resin and on the basis of said information for controlling the molten resin compression, said preset compression force being provided by said preset compression force providing means and stored in said memory means, and said compression force being detected by said pressure detecting means, and for controlling the output torque of the servomotor corresponding to said axis associated with the molten resin compression other than that of an injection servomotor so that a compression force actually applied to the molten resin attains said preset compression force, whereby a molten resin compression operation is carried out by said servomotor associated with said specified axis during an injection molding operation including injection, hold, and metering.

6. An electrically-operated injection compression molding machine according to claim 5, wherein said processing device for numerical control is operable to execute the pulse distribution for said specified axis concurrently with the execution of pulse distribution for an axis other than said specified axis.

7. An electrically-operated injection compression molding machine according to claim 5, wherein said means for setting the molten resin compressing operation timing for starting the molten resin compression is comprised of a timer.

8. An electrically-operated injection compression molding machine according to claim 5, wherein said control information for molten resin compression includes a feed amount, feed rate and feed direction of said specified axis, and a torque limit value indicative of an upper limit value of an output torque of the servomotor associated with said specified axis.

* * * * *

UNITED STATES PATENT AND TRADEMARK OFFICE
CERTIFICATE OF CORRECTION

PATENT NO.   : 5,251,146
DATED        : OCTOBER 5, 1993
INVENTOR(S)  : NORIAKI NEKO ET AL.

It is certified that error appears in the above-indentified patent and that said Letters Patent is hereby corrected as shown below:

Col. 7, line 30, "step," should be --step (c),--.

Signed and Sealed this

Tenth Day of May, 1994

Attest:

BRUCE LEHMAN

Attesting Officer     Commissioner of Patents and Trademarks